United States Patent [19]

Kanai et al.

[11] Patent Number: 4,887,449
[45] Date of Patent: Dec. 19, 1989

[54] METHOD FOR FORMING A PISTON HAVING A PEG

[75] Inventors: Tamotsu Kanai, Kooriyama; Katsunori Hayashi, Fukushima, both of Japan

[73] Assignee: Akebono Brake Industry Co., Ltd., Tokyo, Japan

[21] Appl. No.: 238,704

[22] Filed: Aug. 31, 1988

[30] Foreign Application Priority Data

Sep. 4, 1987 [JP] Japan ................................ 62-220240

[51] Int. Cl.4 ............................................ B21K 01/18
[52] U.S. Cl. .................................. 72/356; 29/156.5 R
[58] Field of Search ................................ 72/356, 377; 29/156.5 R

[56] References Cited

U.S. PATENT DOCUMENTS

| 2,747,266 | 5/1956 | Schaming | 72/377 |
| 2,760,263 | 8/1956 | Geertsen | 72/377 |
| 2,797,595 | 7/1957 | Smith et al. | 72/356 |

FOREIGN PATENT DOCUMENTS

| 6954 | 3/1965 | Japan | 72/377 |
| 159712 | 12/1979 | Japan | 72/377 |

Primary Examiner—Lowell A. Larson
Attorney, Agent, or Firm—Finnegan, Henderson, Farabow, Garrett and Dunner

[57] ABSTRACT

A method for forming a cup-shaped piston having a peg comprises a first preform step forming a first preform having a flat top surface and a recessed portion at its bottom, a second preform step forming therein a second preform having a projecting or recessed portion on the top surface of the end portion in order to readily form a peg, and a final step finishing the second preform to have the cup-shaped piston having the peg.

7 Claims, 3 Drawing Sheets

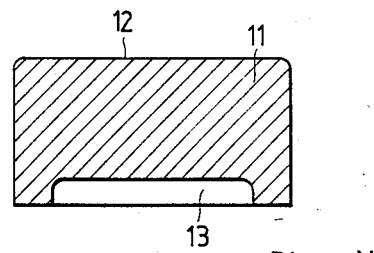
FIG. 3A
PRIOR ART
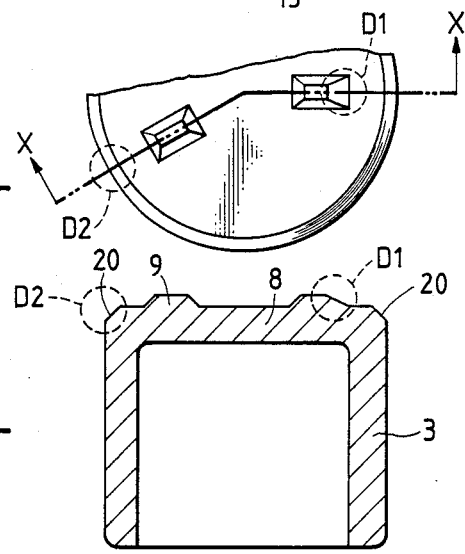
FIG. 3B
PRIOR ART
FIG. 3C
PRIOR ART
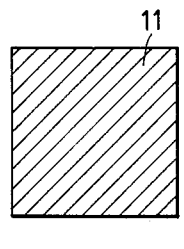
FIG. 4A
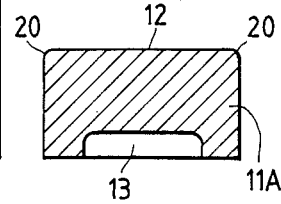
FIG. 4B
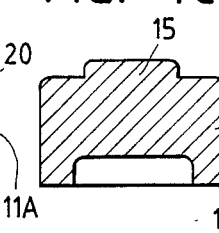
FIG. 4C
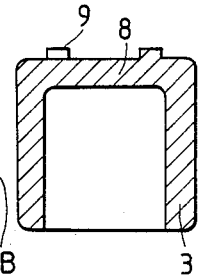
FIG. 4D

4,887,449

METHOD FOR FORMING A PISTON HAVING A PEG

BACKGROUND OF THE INVENTION

The present invention relates to a method for forming a piston having a peg which is applied to a brake of a fluid pressure type.

FIG. 1 shows a known disc brake apparatus. In the disc brake apparatus, a brake body 1 is provided with a cylinder 2 and a cup-shaped piston 3 sealably and slidably mounted inside of the cylinder 2. The brake apparatus is arranged so that an open end of the cup-shaped piston 3 extends from the cylinder 2 and abuts against a backing plate 5 of a brake pad 4. The cylinder 2 forms inside thereof a fluid chamber 18 with an end wall of the piston 3. The end wall 8 of the cup-shaped piston 3 is provided with a peg 9 for providing a gap between the end wall 8 of the piston 3 and a bottom 10 of the cylinder 2 while the peg 9 abuts against the bottom 10. Owing to such a structure, a pressurized brake fluid is readily supplied from an inlet 7. When the brake operation is actuated, the pressurized brake fluid is supplied to the fluid chamber 18 through the inlet 7 to thereby actuate the end wall 8 of the piston 3 so that the cup-shaped piston 3 urges the brake pad 4 against a rotor 6 and then the brake is performed.

In the conventional method, the cup-shaped piston having the peg is formed in accordance with steps shown in FIGS. 2A to 2C. That is, a metallic material 11 is cut out to have a predetermined measure as illustrated in FIG. 2A. In the next step shown in FIG. 2B, the metallic material 11 is cold forged to form a cylindrical preform having a flat top surface 12 and a cornered edge portion 20. Finally, the preform is finished to form a cup-shaped piston 3 having a peg 9 on the top surface of the end wall 8 at a final step shown in FIG. 2C. Thus, the cup-shaped piston 3 is serially formed.

As described above, in the conventional method for forming a cup-shaped piston after the metallic material 11 is preformed in the step shown in FIG. 2B, the preform is directly finished to form the cup-shaped piston having the peg. However, such a conventional method shown in FIG. 2A to 2C may cause a difficulty as shown in FIGS. 3A to 3C. In the drawings, the step shown in FIG. 3A corresponds to that shown in FIG. 2B and FIGS. 3B and 3C correspond to FIG. 2C. FIG. 3B is a top view of the cup-shaped piston and FIG. 3C is a sectional view cut out by a line X—X of FIG. 3B. Specifically, in the conventional method since the peg of the cup-shaped piston is projected directly from a flat top surface of the end wall of the piston, the peg may have a relatively large drop part D1 as shown in FIGS. 3B and 3C so that it is difficult to obtain a precise measure.

Further, since a preferred material flow at a part D2 of the cornered edge portion may be deformed due to the projecting portion 9 as illustrated in FIGS. 3B and 3C, it would be difficult to obtain a required precise measure of the piston. Furthermore, the conventional method raises a possibility to cause the cornered edge portion to be chipped off or cracked. The piston having such a difficulty would have a problem that if the piston is applied to a brake apparatus of a fluid pressure type, the chipped or cracked portion may be rusted due to the aqueous brake fluid since the chipped or cracked portion would not be sufficiently plated.

SUMMARY OF THE INVENTION

Accordingly, an object of the present invention is to eliminate the above-described difficulty accompanying a conventional method. More specifically, an object of the present invention is to provide a method for forming a cup-shaped piston having a peg being applicable to a brake apparatus of a fluid pressure-type, which does not cause the aforementioned difficulty of the conventional method.

Another object of the present invention is to provider a method for forming a cup-shaped piston having a peg in which a cornered edge portion on a top surface of an end wall of the piston is readily formed in simple steps.

According to the method of the invention, first a metallic material is prepared by cutting out or the like to have a predetermined measure and the final cup-shaped piston having the peg is formed by the following steps. The method of the invention includes a first preform step forming a first preform having a flat top surface and a recessed portion at its bottom, a second preform step forming therein a second preform having a projecting or recessed portion on the top surface of the end portion in order to readily form a peg, and a final step finishing the second preform to have the cup-shaped piston having the peg.

Since the method of forming a cup-shaped piston according to the present invention includes the second preform step in which the projecting or recessed portion is formed on the top surface of the end wall corresponding to the shape of the peg in order to readily form the peg, the preferred material flow at the cornered edge portion is prevented from being deformed. Accordingly, the cup-shaped piston formed through the steps of the invention can obtain a required precise measure particularly at the projecting portion and the cornered edge portion. More specifically, the piston according to the present invention does not have any drop part and a chipped or cracked portion so that the piston is not rusted if applied to the brake apparatus of the fluid pressure type.

BRIEF DESCRIPTION OF THE DRAWINGS

FIGS. 3A to 3C show a cup-shaped piston formed by the conventional steps illustrated in FIGS. 2A to 2C.

FIGS. 4A to 4D show a steps for forming a cup-shaped piston according to the present invention.

DETAILED DESCRIPTION OF THE INVENTION

Figure 1:
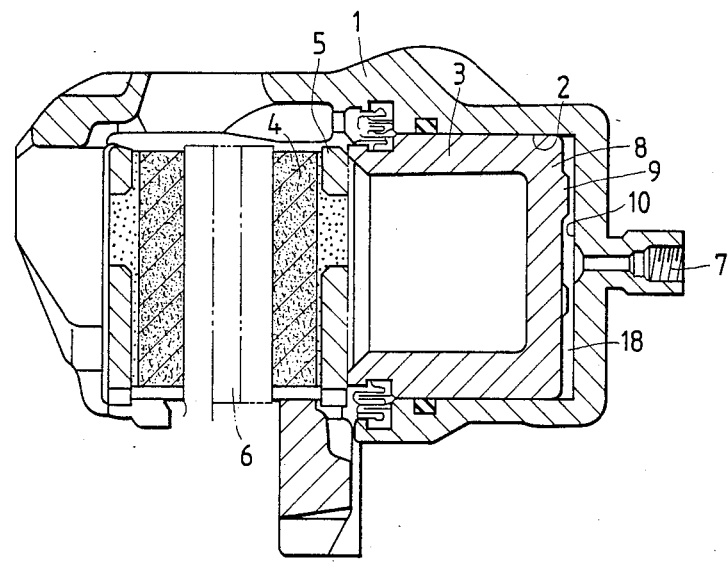
FIG. 1 is a section view showing a known disc brake apparatus.

In a known disc brake apparatus shown in FIG. 1 a cup-shaped piston 3 is slidably mounted inside of the cylinder 2 as disclosed above. The inside of the cylinder 2 forms a fluid chamber with an end wall 8 of the piston 3 in which a pressurized fluid is introduced through an inlet 7 to urge a backing plate 5 of a brake pad toward the brake disc rotor 6 thereby performing a brake action. The end wall 8 of the cup-shaped piston 3 is provided with a peg 9 protruding therefrom and abutting against a bottom portion 10 the cylinder 2 thereby providing a gap between the bottom portion 10 of the cylinder 2 and the end wall 8 of the piston 3 while the cup-shaped piston 3 is not actuated, so that the pressurized fluid is readily introduced into the fluid chamber 18 through the inlet 7.

According to the present invention, the cup-shaped piston 3 is formed by four steps shown in FIGS. 4A to 4D. Specifically, a metallic material 11 having a predetermined measure is prepared by cutting, for example, a cylindrical metallic material 11 to have the predetermined measure in a first step illustrated in FIG. 4A. In a second step shown in FIG. 4B, the metallic material 11 is cold forged thereby forming a first cylindrical preform 11A having a flat top surface 12 which is to be the end wall of the piston with a cornered edge portion 20 thereof and a recessed portion 13 at a bottom. In a third step shown in FIG. 4C, a second preform 11B is formed to have a projection portion 15 or recessed portion corresponding to a shape of a peg on the top surface 12 in order to readily form a peg in the next step. Finally, the second preform 11B is finished in a fourth step to form a cup-shaped piston 3 having a peg 9 on the top surface of the end wall 8 as shown in FIG. 4D. Thus, the cup-shaped piston 3 is serially provided according to the present invention.

Figure 5:
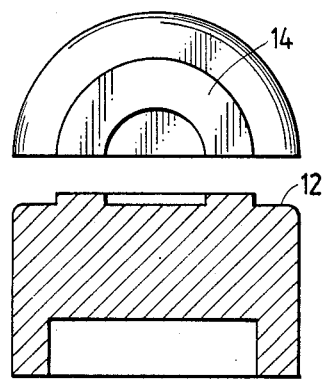
FIGS. 5 to 8 show the other arrangements of a projecting portion of the invention.
Figure 6:
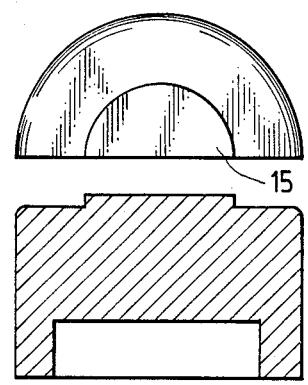
Figure 7:
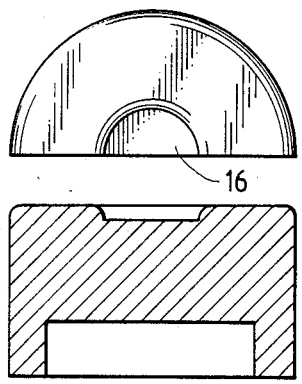
Figure 8:
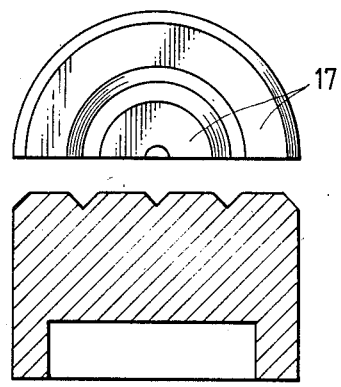

In the third step shown in FIG. 4C, the projecting portion 15 or the recessed portion is previously formed on the top surface of the end wall 8 of the second preform 11B in order to readily form a peg 9 in the fourth step. A shape of the projecting portion 15 and the recessed portion are not limited to a specific shape but the projecting portion and the recessed portion may be formed in various shapes. For example, as shown in FIG. 5, a doughnut-like projection portion 14 may be provided on a top surface 12 of the end portion, or the projecting portion 15 may be a flat cylindrical projection as shown in FIG. 6. Further, as illustrated in FIG. 7, a circular recessed portion 16 is formed on the top surface, or two ring-like projecting portions 17 may be formed on the top surface as shown in FIG. 8. Further, the piston 3 may be of various types although it is cup-shaped in the afore-described embodiment.

Figure 2A:
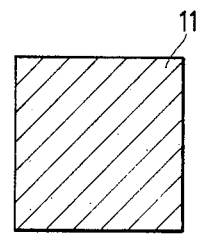
FIGS. 2A to 2C show conventional steps for forming a cup-shaped piston having a peg.
Figure 2B:
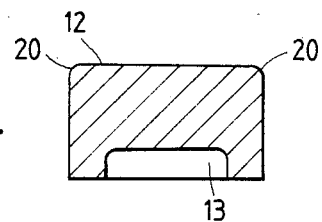
Figure 2C:
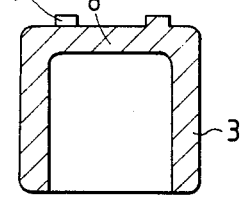

As disclosed above, a cup-shaped piston is conventionally formed from a metallic material through the three steps shown in FIGS. 2A to 2C. According to the present invention, however, the piston is formed through the four steps shown in FIGS. 4A to 4D. Particularly, the invention includes two steps for providing a preform. That is, in a first preform step corresponding to the second step of the invention shown in FIG. 4B which is the same step as that of the conventional method, a metallic material 11 is cold forged to form a cylindrical first preform 11A having a flat top surface 12 of the end wall, a cornered edge portion 20 and a recessed portion 13 at the bottom. The method according to the present invention further includes a second preform step corresponding to the third step shown in FIG. 4C forming therein a second preform 11B having a projecting or recessed portion corresponding to a shape of a peg in order to readily form a peg in the next step. Therefore, the piston formed by the method of the invention can prevent a problem or difficulty accompanying the conventional method. That is, in the conventional method since the peg of the cup-shaped piston is projected directly from a flat top surface of the end wall of the piston, the peg may have a relatively large drop part D1 as shown in FIGS. 3B and 3C so that it is difficult to obtain a precise measure.

Further, since a preferred material flow at a part D2 of the cornered edge portion may be deformed due to the projecting portion 9 as illustrated in FIGS. 3B and 3C. it would be difficult to obtain a required precise measure of the piston. Furthermore, the conventional method raises a possibility to cause the cornered edge portion to be chipped off or cracked. The piston having such a difficulty would have a problem that if the piston is applied to a brake apparatus of a fluid pressure type, the chipped or cracked portion may be rusted due to the aqueous brake fluid since the chipped or cracked portion would not be sufficiently plated. On the other hand, since the method of forming a cup-shaped piston according to the present invention includes the second preform step in which the projecting or recessed portion is formed on the top surface 12 of the end wall corresponding to the shape of the peg in order to readily form the peg, the preferred material flow at the cornered edge portion is prevented from being deformed. Accordingly, the cup-shaped piston formed through the step of the invention can obtain a required precise measure particularly at the projecting portion and the cornered edge portion. More specifically, the piston according to the present invention does not have any drop part and a chipped or cracked portion so that the piston is not rusted if applied to the brake apparatus of the fluid pressure type.

What is claimed is:

1. A method for forming a piston having a peg projecting from and disposed on a top surface of an end portion for use in a brake apparatus of a fluid pressure type, comprising the steps of:

preparing a metallic material having a predetermined measure, forming a first preform having a flat top surface and a bottom surface configured with a central recessed portion, forming a second preform from said first preform, said second preform having a portion projecting from said flat top surface; and forming the projecting peg from a portion of said projecting portion on said flat top surface.

2. The method of claim 1, wherein said second preform forming step includes forming said projecting portion into an annular configuration.

3. The method of claim 1, wherein said second preform forming step includes forming said projecting portion into a cylindrical configuration.

4. The method of claim 1, wherein said second preform forming step includes forming said projecting portion into a configuration having a plurality of concentric annular projections.

5. A method for forming a piston having a peg disposed on a top surface of an end portion for use in a brake apparatus of a fluid pressure type, comprising the steps of:

preparing a metallic material having a predetermined measure, forming a first preform having a flat top surface and a bottom surface configured with a recessed portion, forming a second preform from said first preform, said second preform having a portion recessed in said flat top surface, and forming said peg from said recessed portion on said flat top surface.

6. The method of claim 1 or 5, wherein said forming steps include a process of cold forging said first and second preforms.

7. A method for forming a piston having a peg projecting from and disposed on a top surface of an end portion for use in a brake apparatus of a fluid type, comprising the steps of:

preparing a metallic material having a predetermined measure;

forming a first preform into a configuration having a cylindrical outer surface, an adjoining flat top surface, and a bottom surface configured with a central recessed portion therein, said outer surface and top surface defining an outer peripheral edge of a predetermined diameter;

forming a second preform from said first preform into a configuration having a centrally disposed portion with a diameter less than the diameter of said outer peripheral edge projecting from said flat top surface; and forming the projecting peg from a portion of said centrally disposed projecting portion without deforming the outer peripheral edge of the preform.

* * * * *